(12) United States Patent
Callahan

(10) Patent No.: US 12,547,737 B1
(45) Date of Patent: Feb. 10, 2026

(54) INTELLIGENT IDENTIFICATION OF CORRELATIONS ACROSS SECURITY SERVICES

(71) Applicant: Rapid7, Inc., Boston, MA (US)

(72) Inventor: Julius Callahan, Simi Valley, CA (US)

(73) Assignee: Rapid7, Inc., Boston, MA (US)

( * ) Notice: Subject to any disclaimer, the term of this patent is extended or adjusted under 35 U.S.C. 154(b) by 11 days.

(21) Appl. No.: 18/795,293

(22) Filed: Aug. 6, 2024

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
CPC .................. G06F 21/577; G06F 2221/034
See application file for complete search history.

(56) References Cited

U.S. PATENT DOCUMENTS

| | | | |
|---|---|---|---|
| 8,928,476 B2* | 1/2015 | Jerhotova | G08B 25/14 340/3.1 |
| 9,128,773 B2* | 9/2015 | Beaty | G06F 11/3006 |
| 10,298,607 B2* | 5/2019 | Tang | H04L 12/4625 |
| 10,706,155 B1* | 7/2020 | Veselov | G06F 9/45558 |
| 11,115,437 B2* | 9/2021 | Chesla | G06F 21/56 |
| 11,184,188 B2* | 11/2021 | Ansari | H04L 12/2812 |
| 12,069,553 B2* | 8/2024 | Saldin | H04W 4/80 |
| 2012/0272249 A1* | 10/2012 | Beaty | G06F 9/5083 719/318 |
| 2016/0057166 A1* | 2/2016 | Chesla | H04L 63/1416 726/22 |
| 2019/0306198 A1* | 10/2019 | Feiertag | G06F 21/577 |
| 2021/0117544 A1* | 4/2021 | Kurtz | G06F 21/567 |
| 2021/0226993 A1* | 7/2021 | Sellers | H04L 61/5007 |
| 2022/0286832 A1* | 9/2022 | Saldin | G08B 25/008 |
| 2023/0252135 A1* | 8/2023 | Klonowski | G06F 21/554 726/23 |

* cited by examiner

*Primary Examiner* — J. Brant Murphy
(74) *Attorney, Agent, or Firm* — Ashwin Anand

(57) ABSTRACT

Various embodiments include systems and methods pertaining to a security service platform that includes a correlation engine for identifying correlations between different security services of the security service platform. In some embodiments, the correlation engine may be configured to parse, aggregate, and/or correlate data from an application security service and data from a vulnerability management service to assess coverage (or lack thereof) and/or to assist in remediation prioritization. The correlation engine may generate a report that can be presented to a user via a graphical user interface (GUI).

20 Claims, 10 Drawing Sheets

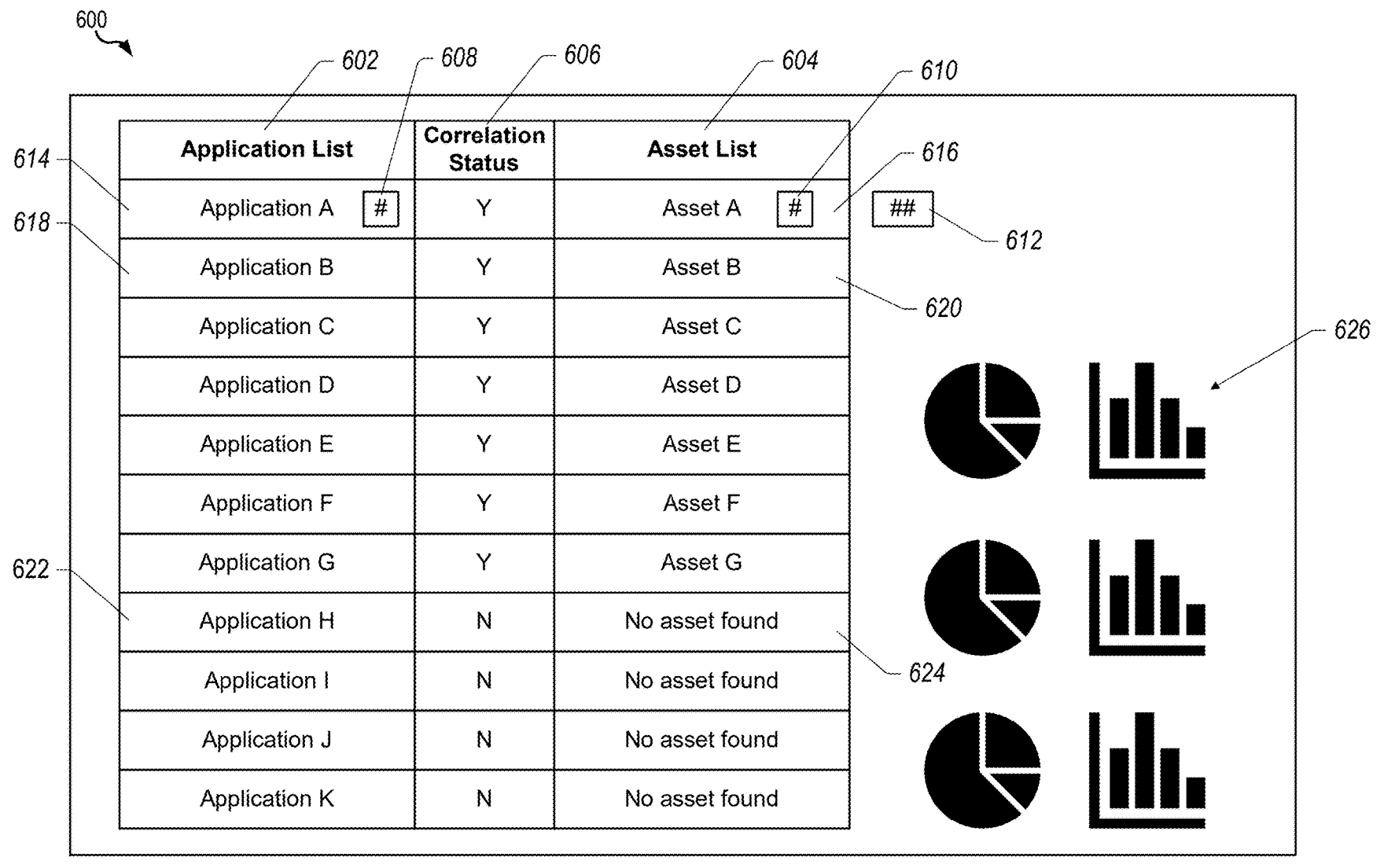

| Application List | Correlation Status | Asset List |
|---|---|---|
| Application A # | Y | Asset A # |
| Application B | Y | Asset B |
| Application C | Y | Asset C |
| Application D | Y | Asset D |
| Application E | Y | Asset E |
| Application F | Y | Asset F |
| Application G | Y | Asset G |
| Application H | N | No asset found |
| Application I | N | No asset found |
| Application J | N | No asset found |
| Application K | N | No asset found |

FIG. 6

INTELLIGENT IDENTIFICATION OF CORRELATIONS ACROSS SECURITY SERVICES

BACKGROUND

Many companies operate computer environments that are connected to public networks such as the internet. While such connections allow users to access resources on public networks, they also expose a company network to cyberattacks. Cyberattacks may obtain sensitive information, gain control of the company's computing systems, or damage company resources. To prevent cyberattacks, security management systems have become increasingly important to protect private company networks against these types of vulnerabilities.

BRIEF DESCRIPTION OF THE DRAWINGS

FIG. 6 illustrates a schematic diagram of an example graphical user interface (GUI), in accordance with some embodiments.

Figure 1:
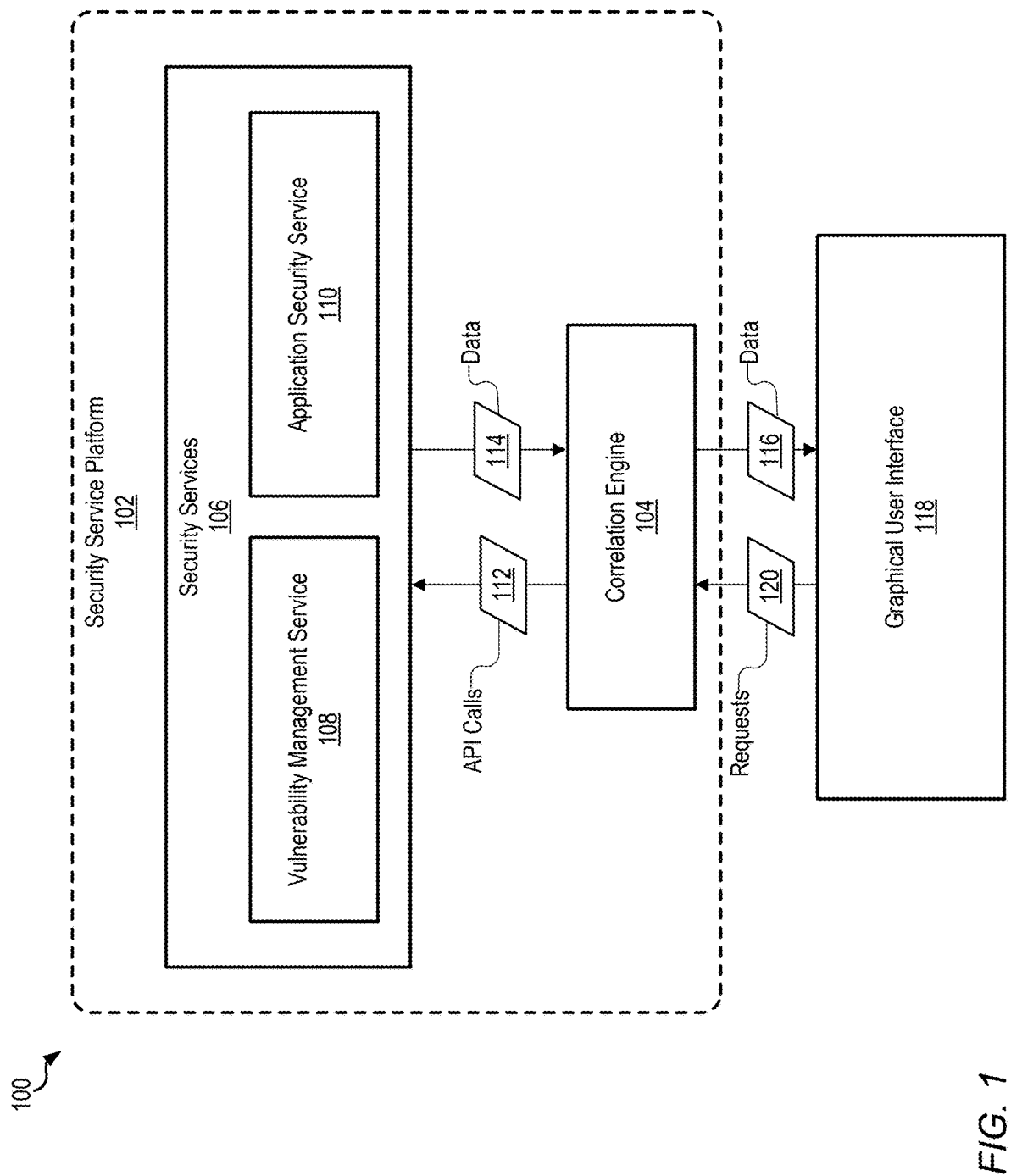
FIG. 1 is a block diagram illustrating an example security service platform that may include a correlation engine for identifying correlations across security services of a security service platform, in accordance with some embodiments.

While embodiments are described herein by way of example for several embodiments and illustrative drawings, those skilled in the art will recognize that embodiments are not limited to the embodiments or drawings described. It should be understood that the drawings and detailed description are not intended to limit embodiments to the particular form disclosed, but on the contrary, the intention is to cover all modifications, equivalents and alternatives falling within the spirit and scope as defined by the appended claims. As used throughout this disclosure, the word "may" is used in a permissive sense (i.e., meaning "having the potential to"), rather than the mandatory sense (i.e., meaning "must"). Similarly, the words "include," "including," and "includes" mean "including, but not limited to".

DETAILED DESCRIPTION OF EMBODIMENTS

As disclosed, a security service platform may provide multiple security services that may be used to detect threats to, and/or assess vulnerabilities of, an application, a computer system, and/or a computer network. In some non-limiting examples, the security service platform may include security services such as an application security service and/or a vulnerability management service, etc. Furthermore, as will be discussed in further detail herein, the security service platform may include a correlation engine that is capable of intelligently identifying correlations between different security services of the security service platform.

In some embodiments, the application security service may be configured to perform black-box security testing to automate identification, triage vulnerabilities, prioritize actions, and remediate application risk. Among other things, the application security service may be used to perform dynamic application security testing (DAST).

In some embodiments, the vulnerability management service may be configured to discover and remediate risks with respect to network assets. The vulnerability management service may implement one or more agents that automatically collect data from various network endpoints, e.g., even those from remote workers and sensitive assets that cannot be actively scanned, or that rarely join the corporate network of a customer. An agent may take a snapshot of an environment upon installation and, from there, may send changes to the vulnerability management service so the impact on the endpoints and network is minimal.

According to some embodiments, respective data from different security services may be useful in their own right, but the siloed nature of the security services may result in lost opportunities for insights that may otherwise be gained from the ability to correlate data across different security services, e.g., via the correlation engine described herein.

In various embodiments, the correlation engine may be configured to aggregate and corelate data from an application security service and data from a vulnerability management service to assess coverage (or lack thereof) and assist in the remediation prioritization process at the asset level. In a non-limiting example, a particular network asset may host a particular web application. According to some embodiments, the correlation engine may correlate an internet protocol (IP) address of the host/network asset with the web application sitting on that host. The correlation engine may determine if the host/network asset is being scanned or has an agent deployed via the vulnerability management service, thus addressing any concerns with the host/network asset being "covered" (or "serviced") by the vulnerability management service. In other words, the correlation engine may determine whether there is a web application running on the host/network asset and, if so, whether the vulnerability management service scanning the host/network asset.

In some embodiments, the correlation engine may be configured to obtain data from a customer's vulnerability management service and application security service instances, and may cross-reference some common denominators like the Common Vulnerability Scoring System (CVSS) (and/or other metrics) to help with remediation prioritization. For example, if a host/network asset has a high number of Common Vulnerabilities and Exposures (CVEs) and happens to be hosting a web application that also has a high number of critical Common Weakness Enumerations (CWEs), the remediation of that particular host/network asset may take priority over another host/network asset. The correlation engine may determine a combined CVSS score for the correlation between the host/network asset and the web application, and may use the combined CVSS score to prioritize the network assets, e.g., in order from high to low for remediation. Furthermore, the correlation engine may call out missing correlations, e.g., if the correlation engine found a web application but no correlated host/network asset that is being scanned by the vulnerability management service.

The CVSS is a standardized framework for assessing and communicating the severity of security vulnerabilities in software systems. It provides a way to objectively evaluate the impact and exploitability of vulnerabilities, aiding organizations in prioritizing and addressing security issues. Organizations can use CVSS scores to prioritize the remediation of vulnerabilities based on their severity. Security professionals can use CVSS scores to communicate the impact and risk associated with vulnerabilities to various stakeholders.

CVEs may be used to uniquely identify and track publicly disclosed information security vulnerabilities. CVEs are standardized identifiers assigned to vulnerabilities and exposures, providing a common language for discussing and sharing information about security issues. The use of CVEs may facilitate collaboration and information exchange among cybersecurity professionals, vendors, and the broader community.

CWEs may be used to identify and categorize common software security weaknesses. CWEs may capture broader categories of weaknesses that can lead to security issues if not properly addressed during the software development lifecycle. CWEs provide a common language and framework for discussing and mitigating software security weaknesses.

Together, CVSS, CVEs, and CWEs can provide a comprehensive approach to understanding, categorizing, and assessing vulnerabilities in software systems. Each CVE entry may include a CVSS score, which is assigned based on the impact and characteristics of the vulnerability. CWE entries may be associated with one or more CVEs, e.g., if a particular weakness has been identified in the context of a specific vulnerability.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, and components have not been described in detail so as not to obscure the disclosed embodiments.

FIG. 1 is a block diagram 100 illustrating an example security service platform 102 that may include a correlation engine 104 for identifying correlations across different security services 106 of the security service platform 102, in accordance with some embodiments. While the correlation engine 102 is shown in FIG. 1 as a separate block from the security services 106, it should be understood that the correlation engine 104 may be part of the security services 106 in various embodiments.

In various embodiments, the correlation engine 104 may be configured to obtain and parse data from disparate security services 106 to enable insightful analytics with respect to security vulnerabilities and remediation actions. For example, the security services 106 may include a vulnerability management service 108 and an application security service 110. The correlation engine 104 may communicate with the vulnerability management service 108 and the application security service 110 via application programming interface (API) calls 112, e.g., to obtain data 114 from each of the vulnerability management service 108 and the application security service 110. The correlation engine 104 may analyze the data 114 to identify correlations between the vulnerability management service 108 and the application security service 110, as will be discussed in further detail herein. The correlation engine 104 may analyze the data 114 and generate a report (e.g., comprising correlation engine-processed data 116) that can be presented to a user via a graphical user interface (GUI) 118. Some non-limiting example components of the report/GUI are discussed herein with reference to at least FIGS. 3 and 6.

Figure 3:
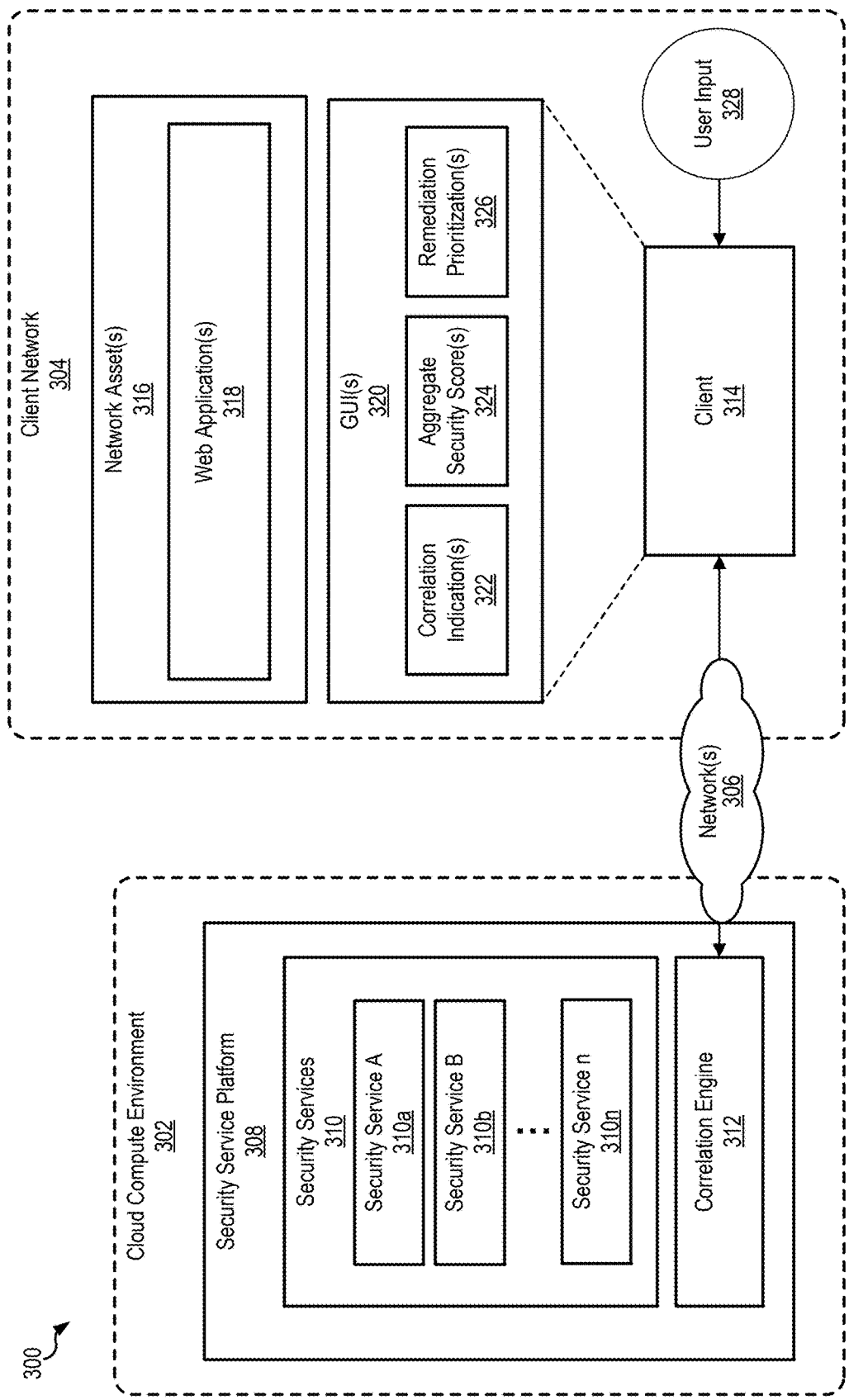
FIG. 3 is a block diagram illustrating an example computing environment that may include a security service platform that includes a correlation engine for identifying correlations across security services, in accordance with some embodiments.
Figure 4:
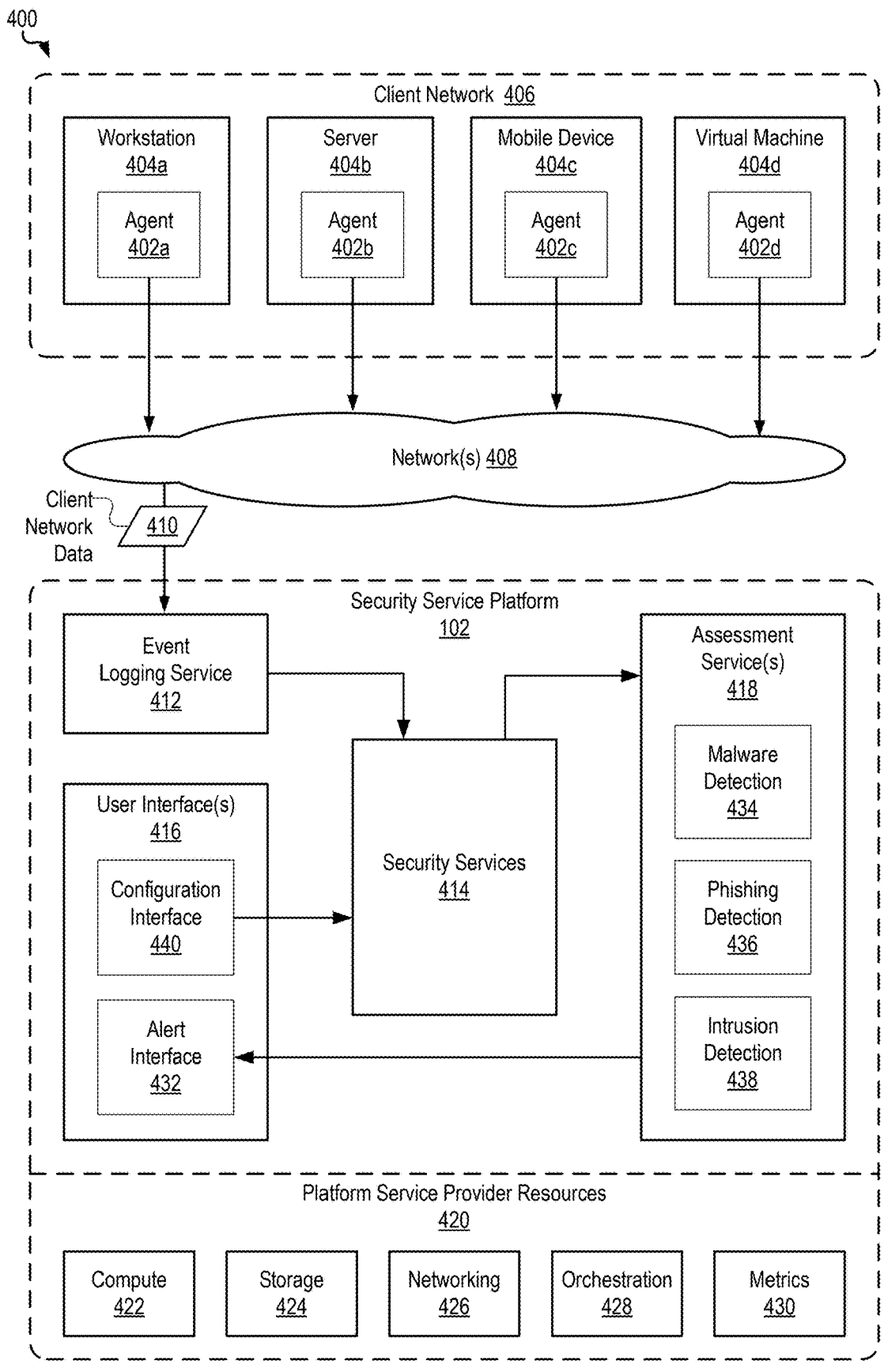
FIG. 4 is a block diagram illustrating example computing resources that implement a security service platform, in accordance with some embodiments.

In various embodiments, the GUI 118 may be used to submit requests 120 (e.g., to the correlation engine 104) for information. For example, a user may use the GUI 118 to submit a request 120 for information in the report generated for a particular organization (and/or customer of the security service platform provider). Although not indicated in FIG. 1, the GUI 118 may be provided at a client in a client network (e.g., a network of a customer of the security service platform provider) in various embodiments. Additionally, or alternatively, the GUI 118 may be provided at the security service platform 102. As indicated in FIGS. 3 and 4, for example, the security services and/or the security service platform may communicate with a client network over one or more other networks. In various embodiments, the security services and/or the security service platform may communicate with multiple different client networks, e.g., corresponding to different customers of the security service platform provider.

In some embodiments, the vulnerability management service 108 may be a vulnerability management solution designed to help organizations identify, assess, and/or prioritize vulnerabilities in their IT environments. The vulnerability management service 108 may discover and profile assets within the organization's network. It may identify devices, servers, endpoints, and/or other components connected to the network. The vulnerability management service 108 may conduct regular vulnerability scans to identify security weaknesses and potential threats within the discovered assets. This may involve checking for known vulnerabilities, misconfigurations, and/or other issues that could be exploited by attackers. In some embodiments, the vulnerability management service 108 may assign a risk score to each asset, e.g., based on the severity of identified vulnerabilities and the potential impact on the organization. This prioritization can help security teams focus on addressing the most critical issues first. The vulnerability management service 108 may provide continuous monitoring to detect changes in the IT environment and identify new assets or vulnerabilities that may emerge over time.

According to some embodiments, the vulnerability management service 108 may enable users to tag and categorize assets based on various criteria such as business units, departments, or compliance requirements. This may allow for customized reporting and focused remediation efforts. The vulnerability management service 108 may be configured to integrate with threat intelligence feeds to enhance vulnerability assessment results. This integration may help organizations understand the context of vulnerabilities and assess whether they are actively being exploited in the wild. The vulnerability management service 108 may provide tools for managing the remediation process. Security teams may track the status of vulnerabilities, assign tasks to team members, and monitor progress. Automated workflows may be established to streamline the remediation process.

In some embodiments, the application security service 110 may be an application security testing solution designed to help organizations identify and remediate vulnerabilities in their web applications. The application security service 110 may discover and profile web applications within an organization's environment. This may include identifying the URLs, endpoints, and components associated with each application. The application security service 110 may conduct both automated and manual testing of web applications to identify security vulnerabilities. Automated scans can include dynamic application security testing (DAST) techniques, such as crawling, scanning, and analyzing the application's behavior to uncover potential issues.

According to some embodiments, the application security service 110 may identify a range of vulnerabilities, including but not limited to, injection attacks, cross-site scripting (XSS), cross-site request forgery (CSRF), and/or security misconfigurations, etc. The tool may be designed to mimic real-world attack scenarios to discover vulnerabilities that could be exploited by malicious actors. The identified vulnerabilities may be assigned risk scores based on their severity and potential impact on the application's security. This prioritization may help organizations focus on addressing the most critical issues first. The application security service 110 may provide interactive and/or customizable reports that offer insights into the security posture of web applications.

Figure 2:
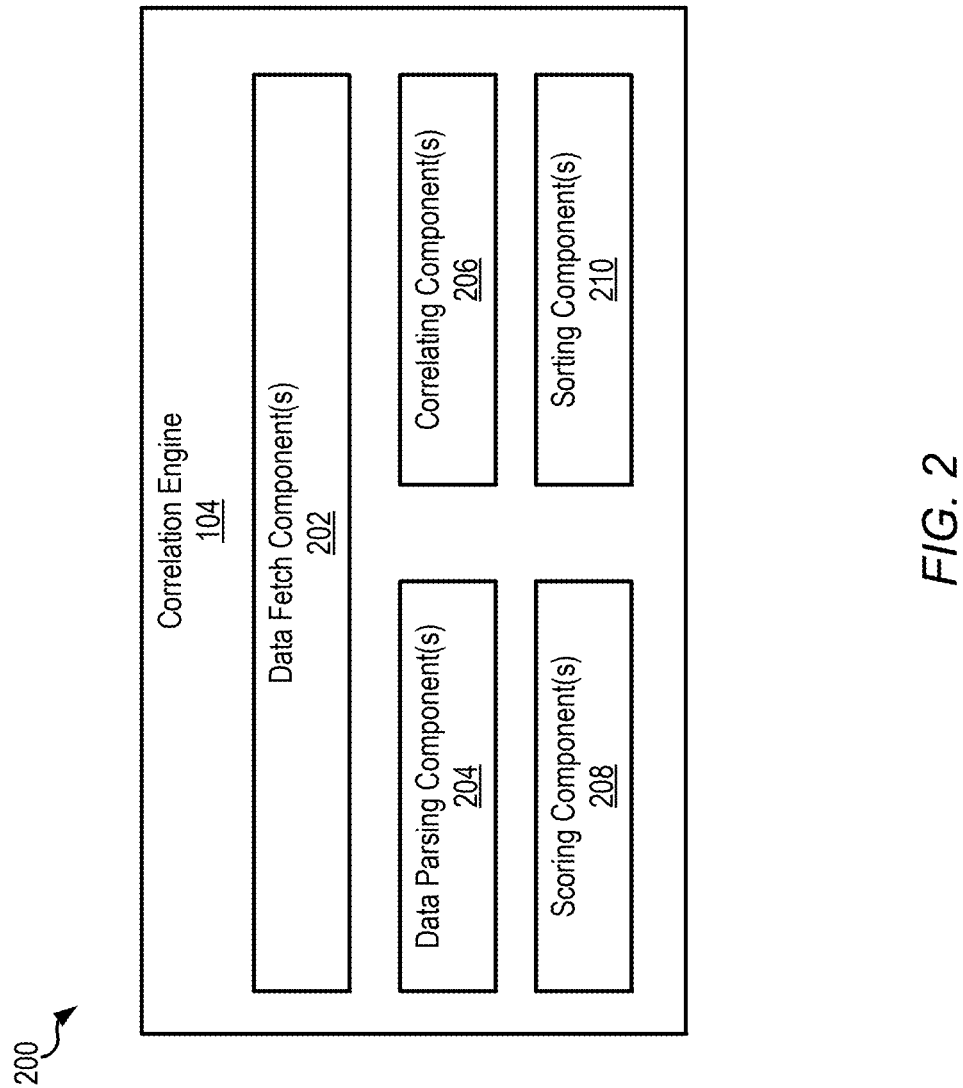
FIG. 2 is a block diagram illustrating example components of a correlation engine for identifying correlations across security services of a security service platform, in accordance with some embodiments.

FIG. 2 is a block diagram 200 illustrating example components of a correlation engine (e.g., correlation engine 104 in FIG. 1) for identifying correlations across security services (e.g., security services 106 in FIG. 1) of a security service platform (e.g., security service platform 102 in FIG. 1), in accordance with some embodiments.

According to some embodiments, the correlation engine 104 may include one or more data fetch components 202, one or more data parsing components 204, one or more correlating components 206, one or more scoring components 208, and/or one or more sorting components 210, etc.

According to some implementations, the data fetch component(s) 202 may be configured to communicate with the security services via one or more application programming interfaces (APIs), e.g., to fetch data from multiple different security services. In some non-limiting examples, the data fetch component(s) 202 may use a first API to communicate with a first security service, and may use a second API to communicate with a second security service. As a non-limiting example, the correlation engine 104 may receive a request (e.g., request 120 in FIG. 1) for a report associated with a particular customer. In order to fulfill the request, the correlation engine 104 may use the data fetch component(s) 202 to retrieve data from API endpoints of both a vulnerability management service (e.g., vulnerability management service 108 in FIG. 1) and an application security service (e.g., application security service 110 in FIG. 1).

According to some implementations, the data parsing component(s) 204 may parse the fetched data. For example, the data parsing component(s) 204 may transform and/or organize the raw data obtained from the security services. In some non-limiting examples, the parsing may include determining and/or organizing information such as, but not limited to: which network assets are being serviced by a vulnerability management service; which web applications are being serviced by an application security service; identification (ID) parameters indicating which network assets are hosting which web applications; and/or CVSS/CVE/CWE information pertaining to network assets and/or web applications; etc.

According to some implementations, the correlating component(s) 206 may be configured to determine correlations between data across different security services. The correlating component(s) may also be configured to identify correlation issues, such as a web application not being correlated with a network asset that is not being scanned by the vulnerability management service. As a non-limiting example, the correlating component(s) 206 may determine, based on data from the application security service, that a particular web application is being hosted by a particular network asset. The correlating component(s) 206 may determine, based on data from the vulnerability management service, that the particular network asset is not being scanned by the vulnerability management service. The correlating component(s) 206 may thus identify a correlation issue, in that the particular web application is not correlated with a scanned network asset (as the particular network asset is not being scanned by the vulnerability management service).

According to some implementations, the scoring component(s) 208 may be configured to calculate security scores associated with instances serviced by the security services and/or aggregate security scores associated with correlated instances. As a non-limiting example, the scoring component(s) 208 may determine a respective security score for each individual web application and/or each individual network asset. Additionally, or alternatively, the scoring component(s) 208 may determine an aggregate security score for each respective correlation between a web application and a particular network asset.

In some non-limiting examples, the security scores may be based at least in part on CVSS scores. For instance, a particular web application may be associated with a first CVSS score, and a particular network asset correlated with the particular web application may be associated with a second CVSS score. An aggregate security score in this example may be determined by summing the first CVSS score and the second CVSS score. It should be understood that the scoring component(s) 208 may additionally, or alternatively, use one or more other factors to determine the individual security scores and/or the aggregate security scores.

According to some implementations, the sorting component(s) 210 may be configured to sort the correlations. For example, the sorting component(s) 210 may sort the correlations so that they are prioritized for remediation. The sorting may be based at least in part on the aggregate security scores. In some non-limiting examples, a first correlation associated with a first aggregate security score may have a higher remediation priority over a second correlation associated with a second aggregate security score that is lower than the first aggregate security score. For instance, the first aggregate security score may correspond to a first aggregate CVSS score, and the second aggregate security score may correspond to a second aggregate CVSS score that is lower than the first aggregate CVSS score.

FIG. 3 is a block diagram illustrating an example computing environment 300 that may include a security service platform (e.g., security service platform 102 in FIG. 1) that includes a correlation engine (e.g., correlation engine 104 in FIG. 1) for identifying correlations across security services (e.g., security services 106 in FIG. 1), in accordance with some embodiments.

In various embodiments, the computing environment 300 may include a cloud compute environment 302 and a client network 304. One or more computing resources in the cloud compute environment 302 may be capable of communicating with one or more computing resources in the client network 304, e.g., via one or more networks 306. In some embodiments, the cloud compute environment 302 may include a security service platform 308, which may include security services 310 and/or a correlation engine 312. The client network 304 may include a client 314 and/or one or more other network assets 316. According to various embodiments, at least a portion of the network asset(s) 316 may host one or more web applications 318, e.g., as also discussed herein with reference to FIG. 5.

According to various embodiments, the security services 310 may include security service A 310a and security service B 310b. In various embodiments, the security services 310 may include additional security services, e.g., as indicated by the ellipses between security service B 310b and security service n 310n in FIG. 3. The correlation engine 312 may be configured to obtain and parse data from different security services 310 to enable insightful analytics with respect to security vulnerabilities and remediation actions, e.g., as also discussed herein with reference to at least FIGS. 1, 2, 5, and 7-9.

In some non-limiting embodiments, the GUIs 320 may include one or more correlation indications 322, one or more aggregate security scores 324, and/or one or more remediation prioritizations 326, etc. The client 314 may receive user input 328 (e.g., via GUI(s) 320), such as requests for a report from the correlation engine 312. The client 314 may submit the request to the correlation engine 312 via the network(s) 306. As previously indicated, the correlation engine 312 may generate a report with information that is responsive to the request, and the report may be sent to the client 314 via the network(s) 306. The client 314 may present information from the report in the GUI(s) 320. Such information may include the correlation indication(s) 322, the aggregate security score(s) 324, and/or the remediation prioritizations 326, etc. An example GUI is discussed herein with reference to FIG. 6.

FIG. 4 is a block diagram illustrating example computing resources that implement a security service platform (e.g., security service platform 102 in FIG. 1) in an example security environment 400, in accordance with some embodiments.

The security service platform 102 may comprise one or more services implemented within a cloud computing environment and/or on a platform service provider network, such as a platform-as-a-service (PaaS) network, an infrastructure-as-a-service provider (IaaS) network, or a software-as-a-service (SaaS) network. The security service platform 102 may be configured to communicate with agents 402a-402d deployed on computing resources 404a-404d in a client network 406.

In this example, the computing resources 404a-404d are depicted as a workstation, a server, a mobile device, and a virtual machine, respectively. In other examples, a computing resource 404 may comprise personal computers, cloud compute instances, laptops, among other types of computing resources, or some other resource that may be vulnerable to a cyberattack. Computing resources are described in greater detail below.

In this example, agents 402 may communicate with the security service platform 102 over one or more intermediary networks 408. In some embodiments, the agents 402 may be configured to collect or compile network activity data or network event data, and transmit the data, depicted as client network data 410, to the security service platform 102. The security service platform 102 may receive network activity data from many different client networks operated by different entities, companies, organizations, groups, etc., and perform remote monitoring of the networks of these different clients.

As shown, the client network 406 in this example includes different types of computing resources, such as a workstation 404a, a server 404b, a mobile device 404c, and a virtual machine 404d. The virtual machine 404d may be an instance of a computer and operating system that is emulated and hosted on a physical virtual machine host. The virtual machine host may implement virtualization hardware and/or software (e.g., a hypervisor) to execute and manage multiple instances of guest operating systems. Example implementations of such virtualization technologies include VMware ESX/ESXI, Microsoft Hyper-V, Amazon Web Services, and Microsoft Azure.

Another type of virtualized execution environment may be a hosted container, which provides a portable and isolated execution environment over a host operating system of a physical host. Examples of container hosting technologies include Docker, Google Kubernetes, Amazon Web Services, and Microsoft Azure. In some embodiments, the virtual machine 404d may be hosted in a platform service provider network, such as the platform service provider network that is hosting the security service platform 102. In some embodiments, the agents 402 may be deployed on other types of computing systems, including embedded systems, networking devices, storage devices, Internet-of-Things (IoT) devices, vehicles, and the like.

In various embodiments, the network 408 may encompass any suitable combination of networking hardware and protocols necessary to enable communications between the agents 402 and the security service platform 102. In some embodiments, the remote machines 404 may execute in a private network of a company, behind a company firewall, and the network 408 may include a public network such as the Internet, which lies outside the firewall. The network 408 may encompass the different telecommunications networks and service providers that collectively implement the Internet.

In some embodiments, the network 408 may also include private networks such as private local area networks (LANs), private wide area networks (WANs), or private wireless networks. The network 408 may be implemented using different hardware (e.g., modems, routers, switches, load balancers, proxy servers, etc.) and software (e.g., protocol stacks, routing software, firewall/security software, etc.) for establishing networking links between the remote machines 404 and the security service platform 102. In some embodiments, the agents 402 may transmit the client network data 410 to the security service platform 102 over secure communication channels such as transport layer security (TLS) connections implemented over the network 408.

As shown in this example, the security service platform 102 is implemented using a number of supporting services 412, 414, 416, and 418 implemented by the platform service provider network. Clients of the security service platform 102 may convey service requests to and receive responses from these services via their respective service interfaces. In some embodiments, the service request and responses may be defined as part of a RESTful API (e.g., one or more web services). The requests and responses may be formatted as JSON documents. In some embodiments, the security service platform 102 may implement service interfaces using other types of remote procedure calling protocols, such as Google Protocol Buffers. The platform service provider network may provide the hardware and/or software needed to implement service endpoints for these services, and the request routing facilities to ensure that a request is properly routed to the appropriate endpoints.

As shown, the platform service provider network may provide different types of computing resources, such as platform service provider resources 420, which can be used by customers to implement hosted services. As shown, the platform service provider may provide resource services such as compute resource service 422, networking resources service 426, orchestration resources service 428, and resource metrics service 430. The services of the security service platform 102 may be built using these underlying resource services provided by the platform service provider.

In some embodiments, the platform service provider resources 490 may implement features such as load balancing of service requests and/or dynamic management and scaling of service node pools. In some embodiments, each of the services 412, 414, 416, and 418 may be implemented using a pool of service nodes provided by the platform service provider, which may be individual instances of virtual machines. In some embodiments, the platform service provider may be a provider such as Amazon Web Services or Microsoft Azure. The security services 414 may include a vulnerability management service (e.g., vulnerability management service 108 in FIG. 1) and an application security service (e.g., application security service 110 in FIG. 1) in various embodiments.

In some embodiments, the security service platform 102 may be configured to monitor, analyze, and respond to security-related incidents that are detected in the remote client networks 406. For example, the security service platform 102 may identify, based at least in part on the client network data 410, a cyberattack.

In some embodiments, the security service platform 102 may implement an event logging service 412 that receives client network data 410 from a client network 406 and stores the received data. The event logging service 412 may implement service functionality to allow users or other software components to query the event logs.

As shown, in some embodiments, the assessment service(s) 418 may implement a variety of monitoring processes to generate alerts in response to detected security problems in the client network 406. These alerts may be forwarded to an alert interface 432, which may allow human security analysts to perform a more in-depth examination of any underlying security problems. For example, in some embodiments, a malware detection module 434 may examine collected machine event logs to detect installation of a particular type of malware executable.

As another example, a phishing detection module 436 may examine the email event logs to detect phishing attacks using new or unusual email addresses, web addresses, or email content. As yet another example, an intrusion detection module 438 may examine the network event logs to detect suspicious communication patterns or attacker packet signatures. In some embodiments, the alerts generated by the assessment service(s) 418 may trigger automated mitigation actions to be performed on the client network 306 to address detected threats in the client network.

In some embodiments, the security service platform 102 may implement one or more user interface(s) 416, which may be implemented as GUIs or web interfaces viewable using a web browser. In some embodiments, these user interfaces 416 may be implemented by client-side applications. As shown, the user interfaces may include the alert interface 432 to notify users of detected alerts. In some embodiments, the alert interface 432 may be accessible from both the client network 406 and a central monitoring location where security analysts are monitoring the client network.

In some embodiments, the user interface(s) 416 may also implement a configuration interface 440. The configuration interface 340 may be used to configure various aspects of the security service platform 102, including the security service 414. For example, the configuration interface 440 may be used to control various aspects of how the security service 414 operates, including initiating a scan, indicating one or more computing resources, and/or specifying a scanning schedule.

In some implementations, the security service platform 102 may be implemented within a container system of a cloud computing environment or a container system of a data center. For example, a container system may be implemented by one or more container orchestration systems, including Kubernetes™, Docker Swarm™, among others. The container orchestration system may run on a cluster of nodes. In some examples, a given node may comprise a container runtime, where the given node may be implemented by one or more compute instances provided by a cloud services provider. In some examples, a given node among the cluster of nodes may comprise a container runtime, compute resources, memory, and one or more container instances.

In some implementations, the security service platform 102 may comprise multiple services. For example, the security service platform 102 may comprise services implemented by containerized applications operating on one or more nodes of a cluster. In this example, the security service platform 102 may be implemented by a one or more containerized applications.

Figure 5:
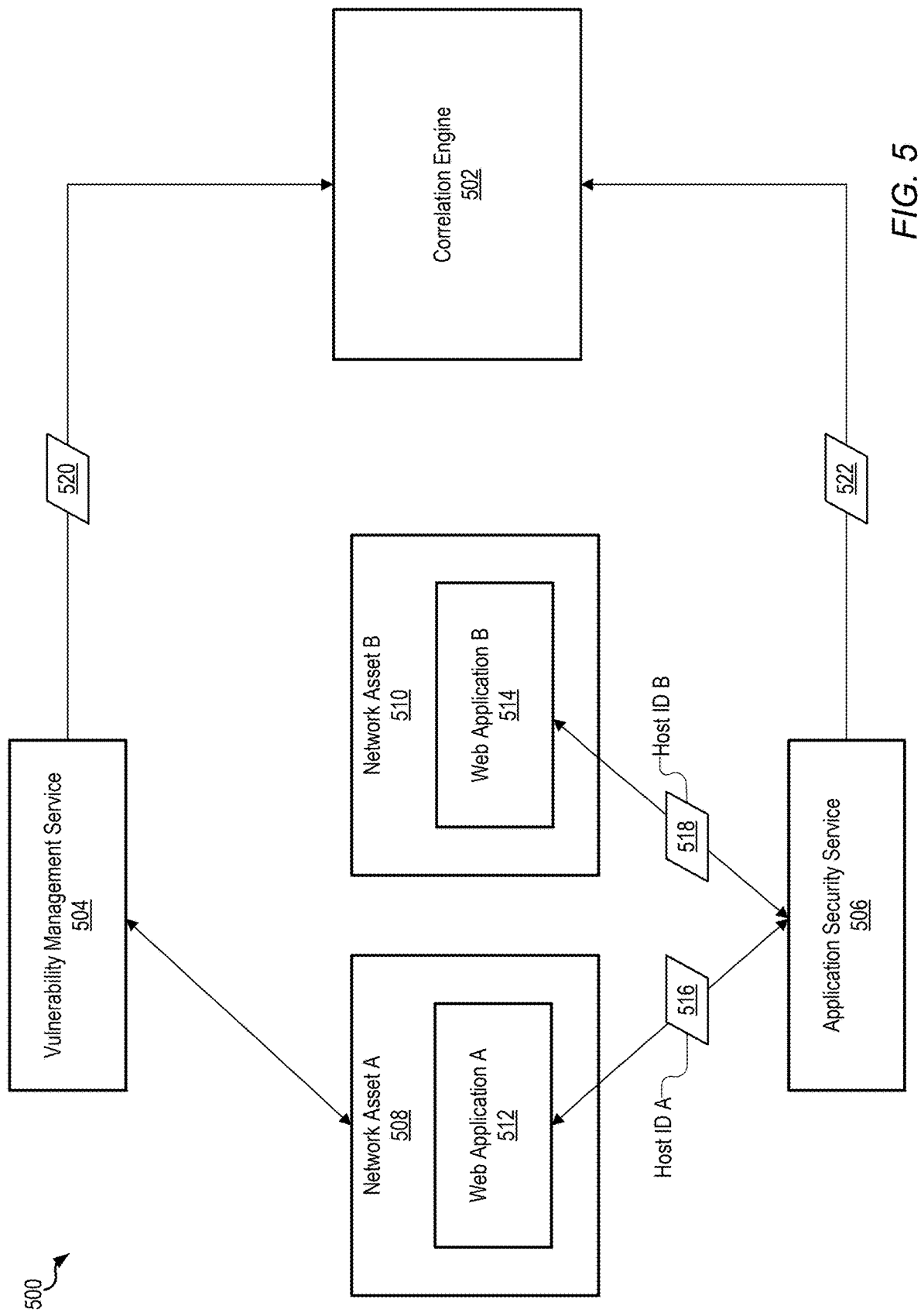
FIG. 5 is a block diagram illustrating an example in which a correlation engine is configured to identify correlations between a vulnerability management service and an application security service, in accordance with some embodiments.

FIG. 5 is a block diagram 500 illustrating an example in which a correlation engine 502 is configured to identify correlations between a vulnerability management service 504 and an application security service 506, in accordance with some embodiments. In some embodiments, a client network may include network asset A 508 and network asset B 510. The client network may further include web application A 512 and web application B 514. Network asset A 508 may host web application A 512. Network asset B 510 may host web application B 514.

In some embodiments, the vulnerability management service 504 may be used to scan network asset A 508 for vulnerabilities. Furthermore, application security service 506 may be used to scan web application A 512 and web application B 514 for vulnerabilities. Data from the application security service 506 that is associated with web application A 512 may include an identification (ID) parameter (e.g., host ID A 516) indicating that network asset A 508 hosts web application A 512. Furthermore, data from the application security service 506 that is associated with web application B 514 may include an ID parameter (e.g., host ID B 518) indicating that network asset B 510 hosts web application B 514. According to some embodiments, the ID parameters may comprise host internet protocol (IP) addresses. For example, host ID A 516 may be network asset A's 508 IP address, and host ID B 518 may be network asset B's 510 IP address.

As indicated in FIG. 5, the vulnerability management service 504 is configured to scan network asset A 508 but not network asset B 510. In that sense, the vulnerability management service 504 can be said to "service," and/or provide "coverage" for, network asset A 508 but not network asset B 510. Furthermore, the application security service 506 is configured to scan web application A 512 and web application B 514. In that sense, the application security service 506 can be said to "service," and/or to provide "coverage" for, web application A 512 and web application B 514. As compared to the systems and techniques disclosed herein, other systems (e.g., that do not include a correlation engine 502) may be unaware of the fact that web application B 514 is hosted on a network asset (e.g., network asset B 510) that is not covered by the vulnerability management service 504. The inclusion of the correlation engine 502 in embodiments disclosed herein enable an assessment of coverage of security services and an identification of lack of coverage, like the lack of coverage of a network asset that is hosting a web application as in the example depicted in FIG. 5.

The correlation engine 502 may obtain (e.g., via data fetch component(s) 202 in FIG. 2) data 520 from the vulnerability management service 504. Furthermore, the correlation engine 502 may obtain (e.g., via data fetch component(s) 202 in FIG. 2) data 522 from the application security service 506. In various embodiments, the correlation engine 502 may parse the data 520 from the vulnerability management service 504 and the data 522 from the application security service 506 to enable insightful analytics with respect to security vulnerabilities and remediation actions, e.g., as discussed herein.

FIG. 6 illustrates a schematic diagram of an example graphical user interface (GUI) 600, in accordance with some embodiments. It should be understood that the GUI 600 may include different, fewer, and/or more components/elements than those indicated in the non-limiting example of FIG. 6.

According to various embodiments, the GUI 600 may display a report that is generated by a correlation engine (e.g., correlation engine 104 in FIG. 1). The information in the report may vary based on one or more factors. For example, the information contained in the report may be based at least in part on what a user submits in one or more requests (e.g., request(s) 120 in FIG. 1) to the correlation engine. As another non-limiting example, the information contained in the report may be based at least in part on the timing of the report being generated. Correlations may change, for example, as coverage of the security services changes from time to time. Information contained in reports generated by the correlation engine may also be different for different customers of the security service platform provider.

In some embodiments, the report in the GUI 600 may include an application list 602, an asset list 604 and/or correlation status indications 606 for each application listed in the application list 602. According to some embodiments, the application list 602 may include a list of web applications identified based at least in part on data that the correlation engine obtained from an application security service. The asset list 604 may include a list of network assets identified based at least in part on data that the correlation engine obtained from a vulnerability management service.

According to some embodiments, the correlation status indications 606 may indicate whether a correlation has been determined between an application in the application list 602 and an asset in the asset list 604. As a non-limiting example, the correlation status indications used in FIG. 6 are a "Y" (for yes) in the case of a correlation being found, and an "N" (for no) in the case of a correlation not being found. However, it should be understood that any other suitable indications (including text, symbols, etc.) may be used to indicate whether a correlation has been found in various embodiments.

According to some embodiments, the report in the GUI 600 may include an individual security score for each application (e.g., a security score having a number value as indicated by the #symbol 608), an individual security score for each asset (e.g., a security score having a number value as indicated by the #symbol 610), and/or an aggregate security score for each correlation (e.g., an aggregate security score as indicated by the ##symbol 612). The individual security scores and the aggregate security scores may be determined, e.g., as discussed herein with reference to the correlating component(s) 208 in FIG. 2.

In the non-liming example shown in FIG. 6, Application A 614 may be correlated with Asset A 616 ("first correlation"). Furthermore, Application B 618 may be correlated with Asset B 620 ("second correlation"). The first correlation may have a higher aggregate security score than the second correlation, and thus the first correlation may be associated with a higher remediation priority than the second correlation. As in FIG. 6, the higher remediation priority of the first correlation may be indicated by the placement of the first correlation above the second correlation.

In the non-limiting example shown in FIG. 6, Application H 622 may not be correlated with any assets in the asset list 604. In place of an ID for an asset, the row in which Application H 622 is listed may include "No asset found" 624 (or the like) in the asset list 604.

In some embodiments, the report in the GUI 600 may include additional information 626, which may include graphs, charts, and/or tables, etc. Some such additional information may include, for example, representations of: total asset CVSS, total application CVSS, total asset CVE, total application CWE, total asset severity, and/or total application severity, etc.

Figure 7:
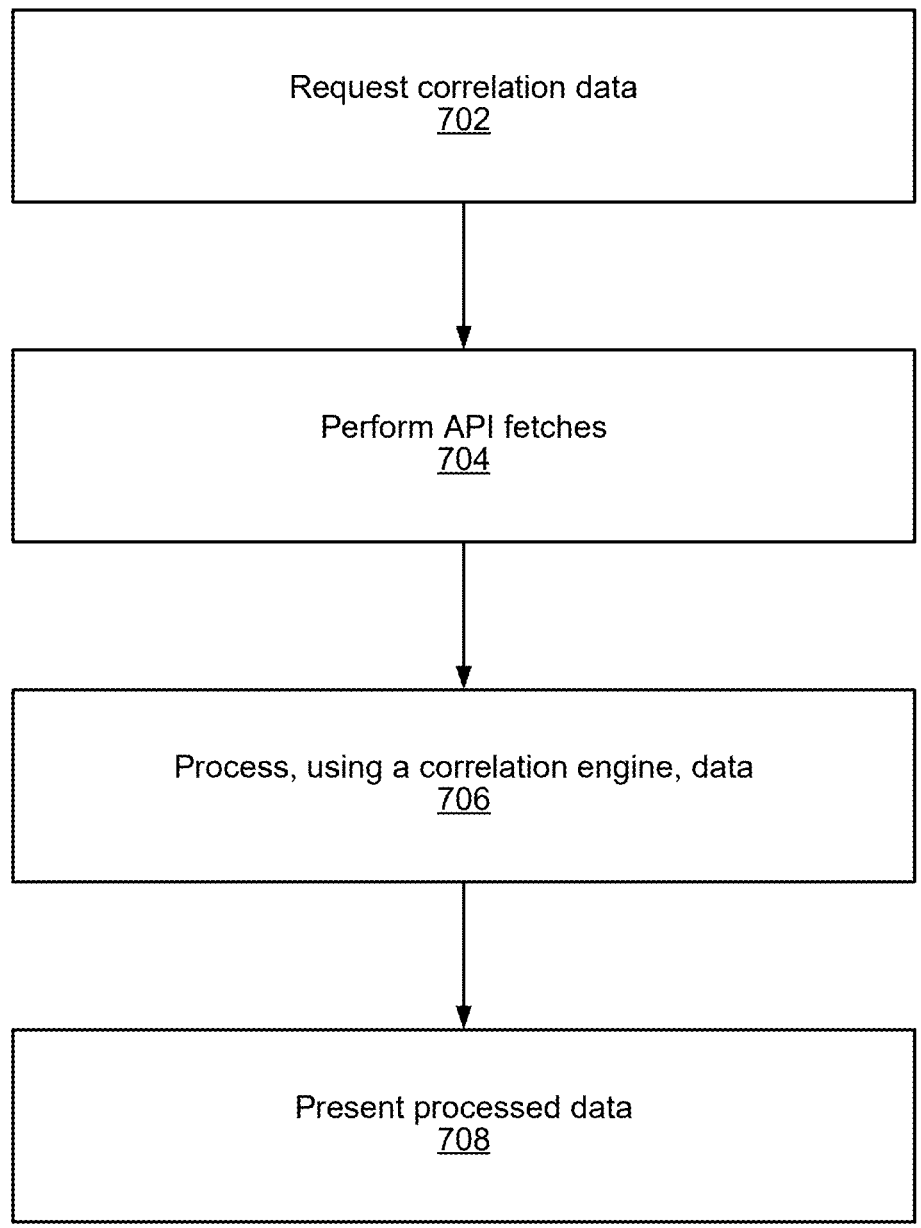
FIG. 7 is a flowchart that illustrates an example method of using a correlation engine to correlate data across different security services of a security service platform, in accordance with some embodiments.

FIG. 7 is a flowchart that illustrates an example method 700 of using a correlation engine (e.g., correlation engine 104 in FIG. 1) to correlate data across different security services (e.g., security services 106 in FIG. 1) of a security service platform (e.g., security service platform 102 in FIG. 1), in accordance with some embodiments.

At 702, the method 700 may include requesting correlation data. According to various examples, the correlation data may comprise data that has been processed by a correlation engine, such as correlation engine-processed data 116 that has been processed by correlation engine 104 in FIG. 1. In some non-limiting examples, a user may use a graphical user interface (GUI) (e.g., GUI 118 in FIG. 1) to submit requests (e.g., requests 120 in FIG. 1) to the correlation engine for the correlation data.

At 704, the method 700 may include performing one or more application programming interface (API) fetches. In various examples, the correlation engine may be capable of fetching data (e.g., data 114 in FIG. 1) from multiple different security services (e.g., security services 106 in FIG. 1) via API(s). For example, in FIG. 1 the correlation engine 104 may use an API to communicate with the vulnerability management service 108. Additionally, or alternatively, the correlation engine 104 may use another API to communicate with the application security service 110. As discussed in FIG. 2, the correlation engine 104 may include data fetch component(s) 202 that may function to carry out the API fetches.

At 706, the method 700 may include processing the data using the correlation engine. For example, as discussed in FIG. 2, the correlation engine 104 may include components such as the data parsing component(s) 204, the correlating component(s) 206, the scoring component(s) 208, and/or the sorting component(s) 210. These components may be used to process the data, e.g., as suitable for providing information responsive to a user request. In some implementations, one or more of these components may be used to parse the fetched data, determine correlations (and/or lack thereof) between data from different security services, determine scores (e.g., individual security scores for individual instances serviced by a security service and/or aggregate security scores for correlated instances across different security services, etc.), and sorting (e.g., based on the scoring) correlated instances and/or individual instances to prioritize them for remediation purposes. Remediation prioritization is also discussed herein with reference to at least FIG. 6.

At 708, the method 700 may include presenting at least a portion of processed data. For example, a report that is responsive to a user request may be generated. In various examples, the correlation engine may generate the report. In various non-limiting examples, the report may include information pertaining to correlations, scoring, and/or sorting, etc. Such information is discussed herein with reference to at least FIG. 6.

Figure 8:
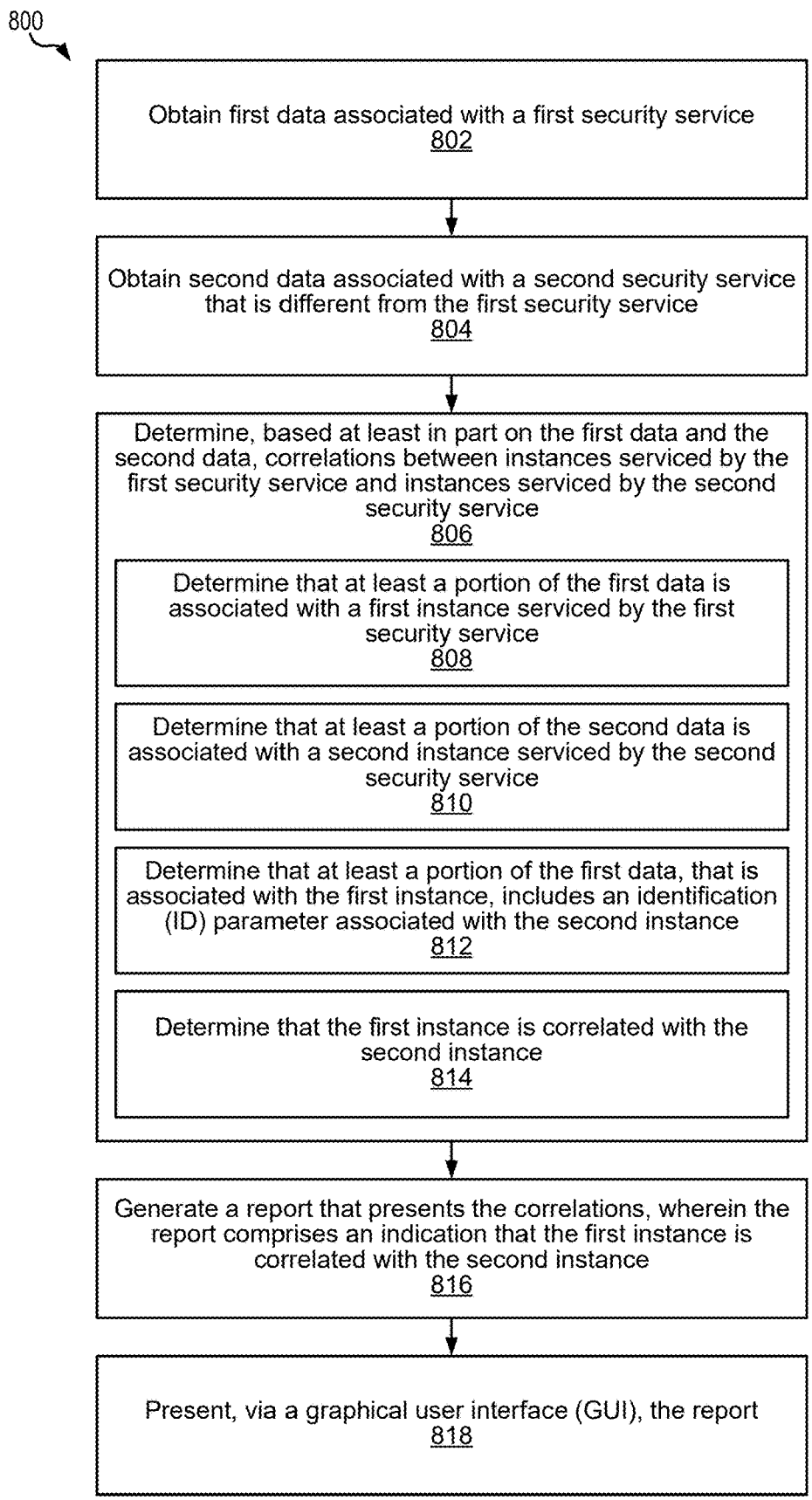
FIG. 8 is a flowchart that illustrates another example method of using a correlation engine to correlate data across different security services of a security service platform, in accordance with some embodiments.

FIG. 8 is a flowchart that illustrates another example method 800 of using a correlation engine (e.g., correlation engine 104 in FIG. 1) to correlate data across different security services (e.g., security services 106 in FIG. 1) of a security service platform (e.g., security service platform 102 in FIG. 1), in accordance with some embodiments.

At 802, the method 800 may include obtaining first data associated with a security service. At 804, the method 800 may include obtaining second data associated with a second security service that is different from the first security service.

At 806, the method 800 may include determining, based at least in part on the first data and the second data, correlations between instances serviced by the first security service and instances serviced by the second security service. For example, determining the correlations (at 806) may include determining that at least a portion of the first data is associated with a first instance serviced by the first security service (at 808). Furthermore, determining the correlations (at 806) may include determining that at least a portion of the second data is associated with a second instance serviced by the second security service (at 810). In addition, determining the correlations (at 806) may include determining that at least a portion of the first data, that is associated with the first instance, includes an identification (ID) parameter associated with the second instance (at 812). Moreover, determining the correlations (at 806) may include determining that the first instance is correlated with the second instance (at 814). For example, determining that the first instance is correlated with the second instance (at 814) may be based at least in part on determining that at least a portion of the first data includes an ID parameter associated with the second instance (at 812).

At 816, the method 800 may include generating a report that presents the correlations. In various examples, the report may comprise an indication that the first instance is correlated with the second instance. At 818, the method 800 may include presenting, via a graphical user interface (GUI), the report.

Figure 9:
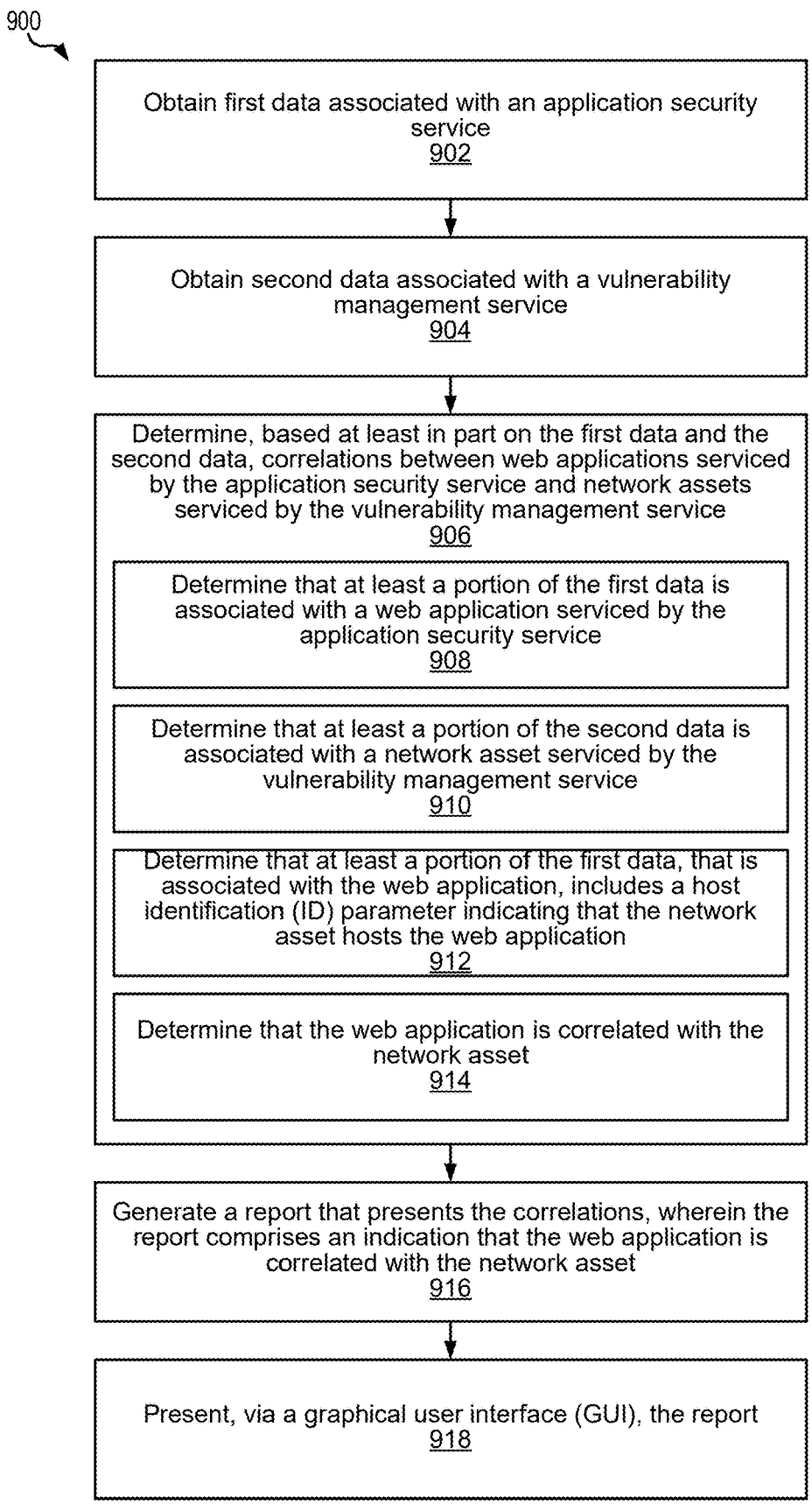
FIG. 9 is a flowchart that illustrates yet another example method of using a correlation engine to correlate data across different security services of a security service platform, in accordance with some embodiments.

FIG. 9 is a flowchart that illustrates yet another example method 900 of using a correlation engine (e.g., correlation engine 104 in FIG. 1) to correlate data across different security services of a security service platform, in accordance with some embodiments.

At 902, the method 900 may include obtaining first data associated with an application security service. For example, the first data may include information related to web applications serviced by the application security service. In various examples, the first data may include host identification (ID) parameters indicating which network assets are hosting which web applications. At 904, the method 900 may include obtaining second data associated with a vulnerability management service. For example, the second data may include information related to network assets serviced by the vulnerability management service.

At 906, the method 900 may include determining, based at least in part on the first data and the second data, correlations between web applications serviced by the application security service and network assets serviced by the vulnerability management service. For example, determining the correlations (at 906) may include determining that at least a portion of the first data is associated with a web application serviced by the application security service (at 908). Furthermore, determining the correlations (at 906) may include determining that at least a portion of the second data is associated with a network asset serviced by the vulnerability management service (at 910). In addition, determining the correlations (at 906) may include determining that at least a portion of the first data, that is associated with the web application, includes a host identification (ID) parameter associated with the network asset (at 912). Moreover, determining the correlations (at 906) may include determining that the web application is correlated with the network asset (at 914). For example, determining that the web application is correlated with the network asset (at 914) may be based at least in part on determining that at least a portion of the first data includes a host ID parameter associated with the network asset (at 912).

At 916, the method 900 may include generating a report that presents the correlations. In various examples, the report may comprise an indication that the web application is correlated with the network asset. At 918, the method 900 may include presenting, via a graphical user interface (GUI), the report.

Figure 10:
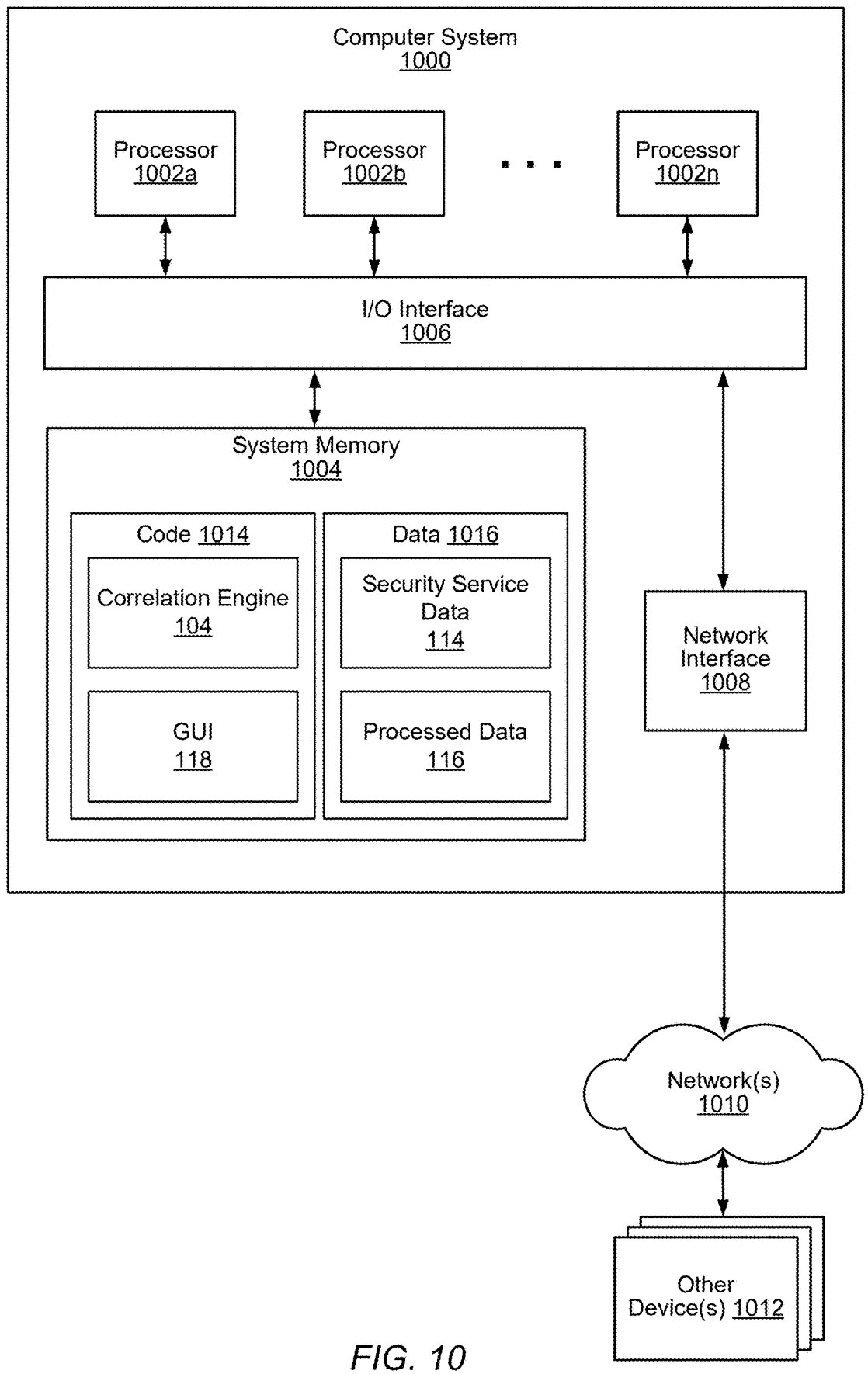
FIG. 10 is a block diagram illustrating an example computer system that implements a security service platform that may include a correlation engine, in accordance with some embodiments.

FIG. 10 is a block diagram illustrating an example computer system 1000 that may be used in a security environment that includes a correlation engine, according to some embodiments. For example, the computer system 1000 may implement the security service platform 102 and/or the correlation engine disclosed herein with reference to FIGS. 1-9.

Computer system 1000 may be implemented using a variety of computing devices, such as a personal computer system, desktop computer, laptop or notebook computer, mainframe computer system, handheld computer, workstation, network computer, a consumer device, application server, mobile telephone, or some other type of computing device.

As shown, computer system 1000 includes one or more processors 1002, which may include multiple cores coupled to a system memory 1004 via an input/output (I/O) interface 1006. Computer system 1000 further includes a network interface 1008 coupled to I/O interface 1006. In some embodiments, computer system 1000 may be a uniprocessor system including one processor 1002, or a multiprocessor system including several processors 1002a-n, as shown. The processors 1002 may be any suitable processors capable of executing instructions. For example, in various embodiments, processors 1002 may implement one of a number of instruction set architectures (ISAs), such as the x86, PowerPC, SPARC, or MIPS ISA.

As shown, the computer system 1000 may also include one or more network communication devices (e.g., network interface 1008) for communicating with other systems and/or components over a communications network (e.g., network(s) 1010). For example, an instance of an application executing on computer system 1000 may use network interface 1008 to communicate with another server application executing on another computer system, as described herein.

As shown, computer system 1000 may use its network interface 1008 to communicate with one or more other devices 1012, such as persistent storage devices and/or one or more I/O devices. In some embodiments, some of these other devices may be implemented locally on the computer system 1000, accessible via the I/O interface 1006. In various embodiments, persistent storage devices may include disk drives, tape drives, solid state memory, other mass storage devices, or any other persistent storage device. The computer system 1000 may store instructions and/or data in persistent storage devices and retrieve the stored instruction and/or data as needed.

As shown, the computer system 1000 may include one or more system memories 1004 that store instructions and data accessible by processor(s) 1002. In various embodiments, system memories 1004 may be implemented using any suitable memory technology, (e.g., one or more of cache, static random-access memory (SRAM), DRAM, RDRAM, EDO RAM, DDR 10 RAM, synchronous dynamic RAM (SDRAM), EEPROM, non-volatile/Flash-type memory, etc.). The system memory 1004 may be used to store code 1014 or executable instructions to implement the methods and techniques described herein. As a non-limiting example, the executable instructions may include instructions to implement a correlation engine 104 and/or graphical user interface 118, etc., as discussed herein with reference to FIG. 1. The system memory 1004 may also be used to store data 1016 needed or produced by the executable instructions. As a non-limiting example, the in-memory data 1016 may include security service data 114 (data from security services) and/or correlation engine-processed data 116, etc., as discussed herein with reference to FIG. 1.

In some embodiments, some of the code 1014 or executable instructions may be persistently stored on the computer system 1000 and may have been loaded from external storage media. The persistent storage of the computer system 1000 and the external media are examples of non-transitory computer-readable storage media, which may be used to store program instructions to be executed by the computer system 1000. A non-transitory computer-readable storage medium may provide the capability to store information in a form readable by a machine (e.g., computer system 1000). Non-transitory computer-readable media may include storage media such as magnetic or optical media, disk or DVD/CD-ROM devices, archival tapes, network-attached storage systems, or other computer systems.

In some embodiments, the I/O interface 1006 may be configured to coordinate I/O traffic between processor 1002, system memory 1004 and any peripheral devices in the system, including through network interface 1008 or other peripheral interfaces. In some embodiments, I/O interface 1006 may perform any necessary protocol, timing, or other data transformations to convert data signals from one component (e.g., system memory 1004) into a format suitable for use by another component (e.g., processor 1002). In some embodiments, I/O interface 1006 may include support for devices attached through various types of peripheral buses, such as a variant of the Peripheral Component Interconnect (PCI) bus standard or the Universal Serial Bus (USB) standard, for example. In some embodiments, the function of I/O interface 1006 may be split into two or more separate components, such as a north bridge and a south bridge, for example. Also, in some embodiments, some or all of the functionality of I/O interface 1006, such as an interface to system memory 1004, may be incorporated directly into processor 1002.

In some embodiments, the network interface 1008 may allow data to be exchanged between computer system 1000 and other devices attached to a network. The network interface 1008 may also allow communication between computer system 1000 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems. Multiple input/output devices may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1008. Network interface 1008 may commonly support one or more wireless networking protocols (e.g., Wi-Fi/IEEE 802.11, or another wireless networking standard). In some embodiments, the network interface 1008 may support communication via telecommunications/telephony networks such as analog voice networks or digital fiber communications networks, via storage area networks such as Fibre Channel SANs, or via any other suitable type of network and/or protocol.

ADDITIONAL DESCRIPTIONS OF EMBODIMENTS (EXAMPLE CLAUSES)

Clause 1: A method, comprising: obtaining, by one or more computing devices, first data associated with a first security service; obtaining, by the one or more computing devices, second data associated with a second security service that is different from the first security service; determining, based at least in part on the first data and the second data, correlations between instances serviced by the first security service and instances serviced by the second security service, wherein the determining comprises: determining that at least a portion of the first data is associated with a first instance serviced by the first security service; determining that at least a portion of the second data is associated with a second instance serviced by the second security service; determining that the portion of the first data, that is associated with the first instance, includes an identification (ID) parameter associated with the second instance; and determining, based at least in part on the determining that the portion of the first data includes the ID parameter, that the first instance is correlated with the second instance; and generating a report comprising the correlations, wherein the correlations include an indication that the first instance is correlated with the second instance.

Clause 2: The method of Clause 1, wherein: the first security service comprises an application security service; and the second security service comprises a vulnerability management service.

Clause 3: The method of Clause 1 or Clause 2, wherein: the first instance serviced by the first security service is a web application; and the second instance serviced by the second security service is a network asset.

Clause 4: The method of any one of Clauses 1-3, wherein the ID parameter is a host ID parameter identifying the network asset as a host of the web application.

Clause 5: The method of Clause 4, wherein the host ID parameter comprises an internet protocol (IP) address of the network asset.

Clause 6: The method of any one of Clauses 1-5, further comprising: determining, based at least in part on the first data, a first security score for the first instance; determining, based at least in part on the second data, a second security score for the second instance; and determining, based at least in part on the first security score and the second security score, an aggregate security score associated with the correlation between the first instance and the second instance; wherein the report further comprises: the aggregate security score; and an indication that the aggregate security score is associated with the first instance and the second instance.

Clause 7: The method of Clause 6, wherein: the determining the first security score for the first instance comprises: determining a first common vulnerability scoring system (CVSS) score for the first instance; the determining the second security score for the second instance comprises: determining a second CVSS score for the second instance; and the determining the aggregate security score comprises: summing the first CVSS score and the second CVSS score.

Clause 8: The method of Clause 7, further comprising: generating, based on the report, a graphical user interface (GUI) structured to present: the correlations including the indication that the first instance is correlated with the second instance; the aggregate security score; and the indication that the aggregate security score is correlated with the first instance and the second instance.

Clause 9: The method of any one of Clauses 1-8, wherein: the indication that the first instance is correlated with the second instance is a first correlation indication; and the report further comprises: a second correlation indication that a third instance is correlated with a fourth instance, wherein the third instance is serviced by the first security service, and wherein the fourth instance is serviced by the second security service; and an indication that a fifth instance is not correlated with any instance that is serviced by the second security service, wherein the fifth instance is serviced by the first security service.

Clause 10: A system, comprising: a memory storing executable instructions; and one or more processors that execute the executable instructions to: obtain first data associated with a first security service; obtain second data associated with a second security service; determine, based at least in part on the first data and the second data, correlations between instances serviced by the first security service and instances serviced by the second security service, wherein, to determine the correlations, the one or more processors execute the executable instructions to: determine that at least a portion of the first data is associated with a first instance serviced by the first security service; determine that at least a portion of the second data is associated with a second instance serviced by the second security service; determine that the portion of the first data, that is associated with the first instance, includes an identification (ID) parameter associated with the second instance; and determine, based at least in part on the determination that the portion of the first data includes the ID parameter, that the first instance is correlated with the second instance; and generate a report comprising the correlations, wherein the correlations include an indication that the first instance is correlated with the second instance.

Clause 11: The system of Clause 10, wherein: the first security service comprises an application security service; and the second security service comprises a vulnerability management service.

Clause 12: The system of Clause 10 or Clause 11, wherein: the first instance serviced by the first security service is a web application; and the second instance serviced by the second security service is a network asset.

Clause 13: The system of any one of Clauses 10-12, wherein the ID parameter is a host ID parameter identifying the network asset as a host of the web application, and wherein the host ID parameter comprises an internet protocol (IP) address of the network asset.

Clause 14: The system of Clause 12 or Clause 13, wherein: the web application is a first web application; the network asset is a first network asset; the application security service services multiple web applications including the first web application and a second web application; the vulnerability management service services multiple network assets including the first network asset and a second network asset; and the one or more processors further execute the executable instructions to: determine that the second web application is correlated with the second network asset; determine a first aggregate security score for the correlation between the first web application and the first network asset; and determine a second aggregate security score for the correlation between the second web application and the second network asset, wherein the first aggregate security score is higher than the second aggregate security score.

Clause 15: The system of Clause 14, wherein the report further comprises: the first aggregate security score; an indication that the first aggregate security score is associated with the correlation between the first web application and the first network asset; the second aggregate security score; an indication that the second aggregate security score is associated with the correlation between the second web application and the second network asset; and based on the first aggregate security score being higher than the second aggregate security score, an indication that the correlation between the first web application and the first network asset has a higher priority for remediation, relative to the correlation between the second web application and the second network asset.

Clause 16: One or more non-transitory computer-accessible storage media storing executable instructions that, when executed by one or more processors, cause one or more computer systems to: obtain first data associated with a first security service; obtain second data associated with a second security service that is different from the first security service; determine, based at least in part on the first data and the second data, correlations between instances serviced by the first security service and instances serviced by the second security service, wherein, to determine the correlations, the one or more processors execute the executable instructions to: determine that at least a portion of the first data is associated with a first instance serviced by the first security service; determine that at least a portion of the second data is associated with a second instance serviced by the second security service; determine that the portion of the first data, that is associated with the first instance, includes an identification (ID) parameter associated with the second instance; and determine, based at least in part on the determination that the portion of the first data includes the ID parameter, that the first instance is correlated with the second instance; and generate a report comprising the correlations, wherein the correlations include an indication that the first instance is correlated with the second instance.

Clause 17: The one or more non-transitory computer-accessible storage media of Clause 16, wherein: the first security service comprises an application security service; and the second security service comprises a vulnerability management service.

Clause 18: The one or more non-transitory computer-accessible storage media of Clause 16 or Clause 17, wherein: the first instance serviced by the first security service is a web application; and the second instance serviced by the second security service is a network asset.

Clause 19: The one or more non-transitory computer-accessible storage media of Clause 18, wherein, to determine that the first instance is correlated with the second instance, the one or more processors execute the executable instructions to cause the one or more computer systems to: determine that the web application is hosted by the network asset.

Clause 20: The one or more non-transitory computer-accessible storage media of Clause 19, wherein the ID parameter is a host ID parameter identifying the network asset as a host of the web application, and wherein the host ID parameter comprises an internet protocol (IP) address of the network asset.

Various modifications and changes may be made as would be obvious to a person skilled in the art having the benefit of this disclosure. The various embodiments described herein are meant to be illustrative and not limiting. Many variations, modifications, additions, and improvements are possible. These and other variations, modifications, additions, and improvements may fall within the scope of embodiments as defined in the claims that follow.

What is claimed is:

1. A method, comprising:
    obtaining, by one or more computing devices, first data associated with a first security service;
    obtaining, by the one or more computing devices, second data associated with a second security service that is different from the first security service;
    determining, based at least in part on the first data and the second data, correlations between instances serviced by the first security service and instances serviced by the second security service, wherein the determining comprises:
        determining that at least a portion of the first data is associated with a first instance serviced by the first security service;
        determining that at least a portion of the second data is associated with a second instance serviced by the second security service;
        determining that the portion of the first data, that is associated with the first instance, includes an identification (ID) parameter associated with the second instance; and
        determining, based at least in part on the determining that the portion of the first data includes the ID parameter, that the first instance is correlated with the second instance; and
    generating a report comprising the correlations, wherein the correlations include an indication that the first instance is correlated with the second instance.

2. The method of claim 1, wherein:
    the first security service comprises an application security service; and
    the second security service comprises a vulnerability management service.

3. The method of claim 2, wherein:
    the first instance serviced by the first security service is a web application; and
    the second instance serviced by the second security service is a network asset.

4. The method of claim 3, wherein the ID parameter is a host ID parameter identifying the network asset as a host of the web application.

5. The method of claim 4, wherein the host ID parameter comprises an internet protocol (IP) address of the network asset.

6. The method of claim 1, further comprising:
    determining, based at least in part on the first data, a first security score for the first instance;
    determining, based at least in part on the second data, a second security score for the second instance; and
    determining, based at least in part on the first security score and the second security score, an aggregate security score associated with the correlation between the first instance and the second instance;
    wherein the report further comprises:
        the aggregate security score; and
        an indication that the aggregate security score is associated with the first instance and the second instance.

7. The method of claim 6, wherein:
    the determining the first security score for the first instance comprises:
        determining a first common vulnerability scoring system (CVSS) score for the first instance;
    the determining the second security score for the second instance comprises:
        determining a second CVSS score for the second instance; and
    the determining the aggregate security score comprises:
        summing the first CVSS score and the second CVSS score.

8. The method of claim 7, further comprising:
    generating, based on the report, a graphical user interface (GUI) structured to present:
        the correlations including the indication that the first instance is correlated with the second instance;
        the aggregate security score; and
        the indication that the aggregate security score is correlated with the first instance and the second instance.

9. The method of claim 1, wherein:
    the indication that the first instance is correlated with the second instance is a first correlation indication; and
    the report further comprises:
        a second correlation indication that a third instance is correlated with a fourth instance, wherein the third instance is serviced by the first security service, and wherein the fourth instance is serviced by the second security service; and
        an indication that a fifth instance is not correlated with any instance that is serviced by the second security service, wherein the fifth instance is serviced by the first security service.

10. A system, comprising:
    a memory storing executable instructions; and
    one or more processors that execute the executable instructions to:

obtain first data associated with a first security service;
obtain second data associated with a second security service;
determine, based at least in part on the first data and the second data, correlations between instances serviced by the first security service and instances serviced by the second security service, wherein, to determine the correlations, the one or more processors execute the executable instructions to:
  determine that at least a portion of the first data is associated with a first instance serviced by the first security service;
  determine that at least a portion of the second data is associated with a second instance serviced by the second security service;
  determine that the portion of the first data, that is associated with the first instance, includes an identification (ID) parameter associated with the second instance; and
  determine, based at least in part on the determination that the portion of the first data includes the ID parameter, that the first instance is correlated with the second instance; and
generate a report comprising the correlations, wherein the correlations include an indication that the first instance is correlated with the second instance.

11. The system of claim 10, wherein:
the first security service comprises an application security service; and
the second security service comprises a vulnerability management service.

12. The system of claim 11, wherein:
the first instance serviced by the first security service is a web application; and
the second instance serviced by the second security service is a network asset.

13. The system of claim 12, wherein the ID parameter is a host ID parameter identifying the network asset as a host of the web application, and wherein the host ID parameter comprises an internet protocol (IP) address of the network asset.

14. The system of claim 13, wherein:
the web application is a first web application;
the network asset is a first network asset;
the application security service services multiple web applications including the first web application and a second web application;
the vulnerability management service services multiple network assets including the first network asset and a second network asset; and
the one or more processors further execute the executable instructions to:
  determine that the second web application is correlated with the second network asset;
  determine a first aggregate security score for the correlation between the first web application and the first network asset; and
  determine a second aggregate security score for the correlation between the second web application and the second network asset, wherein the first aggregate security score is higher than the second aggregate security score.

15. The system of claim 14, wherein the report further comprises:
the first aggregate security score;
an indication that the first aggregate security score is associated with the correlation between the first web application and the first network asset;
the second aggregate security score;
an indication that the second aggregate security score is associated with the correlation between the second web application and the second network asset; and
based on the first aggregate security score being higher than the second aggregate security score, an indication that the correlation between the first web application and the first network asset has a higher priority for remediation, relative to the correlation between the second web application and the second network asset.

16. One or more non-transitory computer-accessible storage media storing executable instructions that, when executed by one or more processors, cause one or more computer systems to:
obtain first data associated with a first security service;
obtain second data associated with a second security service that is different from the first security service;
determine, based at least in part on the first data and the second data, correlations between instances serviced by the first security service and instances serviced by the second security service, wherein, to determine the correlations, the one or more processors execute the executable instructions to:
  determine that at least a portion of the first data is associated with a first instance serviced by the first security service;
  determine that at least a portion of the second data is associated with a second instance serviced by the second security service;
  determine that the portion of the first data, that is associated with the first instance, includes an identification (ID) parameter associated with the second instance; and
  determine, based at least in part on the determination that the portion of the first data includes the ID parameter, that the first instance is correlated with the second instance; and
generate a report comprising the correlations, wherein the correlations include an indication that the first instance is correlated with the second instance.

17. The one or more non-transitory computer-accessible storage media of claim 16, wherein:
the first security service comprises an application security service; and
the second security service comprises a vulnerability management service.

18. The one or more non-transitory computer-accessible storage media of claim 17, wherein:
the first instance serviced by the first security service is a web application; and
the second instance serviced by the second security service is a network asset.

19. The one or more non-transitory computer-accessible storage media of claim 18, wherein, to determine that the first instance is correlated with the second instance, the one or more processors execute the executable instructions to cause the one or more computer systems to:
determine that the web application is hosted by the network asset.

20. The one or more non-transitory computer-accessible storage media of claim 19, wherein the ID parameter is a host ID parameter identifying the network asset as a host of the web application, and wherein the host ID parameter comprises an internet protocol (IP) address of the network asset.

* * * * *